United States Patent [19]
DeFilipps

[11] 4,189,736
[45] Feb. 19, 1980

[54] FACSIMILE STYLUS ASSEMBLY
[75] Inventor: Fred A. DeFilipps, Maitland, Fla.
[73] Assignee: Exxon Research & Engineering Co., Florham Park, N.J.
[21] Appl. No.: 828,440
[22] Filed: Aug. 29, 1977
[51] Int. Cl.² .......................................... G01D 15/06
[52] U.S. Cl. ............................. 346/139 C; 346/155
[58] Field of Search .................. 346/139 C, 153, 155, 346/162, 163, 164, 165; 400/119

[56] References Cited
U.S. PATENT DOCUMENTS

| | | | |
|---|---|---|---|
| 2,918,580 | 12/1959 | Howell | 346/155 X |
| 3,018,153 | 1/1962 | Steen | 346/139 C |
| 3,624,661 | 11/1971 | Shebanow | 346/155 |
| 3,752,288 | 8/1973 | Detig | 346/155 X |
| 3,774,229 | 11/1973 | Blackwood | 346/139 C |
| 3,795,010 | 2/1974 | Ring | 346/139 C X |

FOREIGN PATENT DOCUMENTS
1024115 3/1966 United Kingdom .

*Primary Examiner*—Joseph W. Hartary
*Attorney, Agent, or Firm*—Norman L. Norris

[57] ABSTRACT

A facsimile stylus assembly comprises one or more electrical conductors which are completely enshrouded by an electrically insulating sheath except for one end of the conductors which terminates in an uninsulated surface so as to form an output electrode. In one specific embodiment, the sheath comprises an electrically insulating cable having opposed flat surfaces and a plurality of spring wires which are situated within the cable. The spring wires are parallel to and insulated from the conductors. The spring wires are curved to bias the stylus assembly against the document upon which the facsimile recording is to be made.

13 Claims, 9 Drawing Figures

FACSIMILE STYLUS ASSEMBLY

BACKGROUND OF THE INVENTION

This invention relates to stylus assemblies and, more particularly, to stylus assemblies adapted for use in a facsimile receiver.

In a facsimile system, information in the form of pictures of alphanumeric matter on a document at an originating location are scanned and electrical signals are produced which correspond to these pictures and alphanumeric matter. These signals are then transmitted over a suitable transmission path to a facsimile receiver which produces a copy or facsimile of the document. The most commonly used paper for purposes of achieving a high quality facsimile or copy is electrosensitive paper which comprises a paper blank which has been coated on one surface with a black graphite material such as carbon black. The carbon black layer is then coated with an electroresistive layer such as titanium dioxide, $TiO_2$ or zinc oxide, $ZnO$. The transmitted electrical signals representing the original document are then used to energize a stylus which traverses the paper located at a receiving location, the traversal being made in a predetermined path. The energized stylus selectively burns away the electroresistive layer and, in this manner, the carbon black layer is exposed and patterned into a facsimile of the originating document.

The stylus in a facsimile receiver must comprise a hard conductive material which is capable of riding over the surface of the paper without substantial wear so as to assure that the stylus makes the same mark time after time. One such material is tungsten which is also quite brittle. Since prior art tungsten styli have been unsupported at the marking tip as shown in U.S. Pat. No. 3,761,954, stylus breakage is quite common. Also, stylus wear is quite common.

Another problem associated with prior art facsimile stylus assemblies has been that there may be a danger of electric shock to the operator of the device due to the relatively high voltages employed and the exposed unsupported stylus tip. For example, typical facsimile receiver stylus may operate at as much as 200 volts.

A further problem associated with prior art facsimile systems has been the presence of airborne particulate emissions which emanate from the paper. These emissions have been found to include but are not limited to titanium dioxide, zinc oxide, sodium hydroxide, carbon monoxide, carbon dioxide, oxygen, nitrogen, methane, ethane, propane, butanes, hydrogen sulfide, argon, carbon disulfide, sulfur dioxide, carbonyl sulfide, water vapor, nitric oxide and ammonia in various amounts. Further, it is believed that certain facsimile systems may also produce ozone. While it has not been conclusively determined whether any of these emissions may be toxic to the operator of the device or to persons in the immediate vicinity, the emissions are at least annoying and attempts have been made to reduce them.

Thermal sensitive paper such as that shown in U.S. Pat. No. 3,978,270 is characterized by little or no emissions. However, this paper has not been as widely accepted as conventional electrosensitive paper for various reasons. For example, thermal paper is patterned by varying the temperature of the stylus in proportion to transmitted facsimile signals. Since the stylus temperature may not be varied instantaneously due to its thermal inertia, the stylus must traverse the paper at a speed slow enough to allow its temperature to fluctuate. This speed is not sufficiently high for facsimile use. Accordingly, it would be desirable to provide a facsimile stylus assembly which would operate at low particulate emission levels when using conventional facsimile paper.

A still further problem associated with known prior art stylus assemblies is that irregularities in the paper may cause the stylus to vibrate and this vibration may cause the image produced to deteriorate. Accordingly, attempts have been made to fabricate stylus assemblies having sufficient mass to dampen unwanted vibrations and maintain the stylus in contact with the paper. See, for example, U.S. Pat. No. 3,953,861 to Kipling. Another approach has been to positively bias the stylus assembly against the recording paper by means of a spring. See, for example, U.S. Pat. No. 3,774,229 to Blackwood et al and the styli heretofore used in QWIP Systems 1000 and 1200 facsimile transceiver. See also the aforesaid U.S. Pat. No. 3,761,954 which discloses the use of foil strips with a rubber based adhesive strip to control damping characteristics.

SUMMARY OF THE INVENTION

It is an object of the present invention to provide an improved facsimile stylus which is not prone to breakage.

It is another object of this invention to provide an improved stylus assembly which eliminates the danger of electrical shock to the operator of a facsimile receiver.

It is a further object of the present invention to provide a new and improved facsimile stylus assembly characterized by low particulate emissions.

It is a still further object of the present invention to provide a stylus assembly which will create a clear image of an originating document even when the recording surface contains numerous irregularities such as those associated with a drum and clamp which supports the recording medium.

It is also an object of this invention to provide a new and improved stylus assembly which reduces wear of the stylus.

These and other objects of the present invention may be achieved with the use of a stylus assembly having one or more electrical conductors terminating at one extremity so as to form an output electrode surface adapted to mark an electrically sensitive recording medium in response to an electrical potential between the conductor and the recording medium. A sheath of electrical insulating material surrounds the stylus except at the output electrode surface. In one embodiment, the sheath comprises an insulating cable having opposing flat surfaces, and a plurality of spring wires are parallel to the conductor and enclosed within the sheath. In this embodiment, the spring wires are curved to bias the stylus assembly toward the receiving document. In a particularly preferred embodiment of the invention, the electrically sensitive paper comprises an electrosensitive paper.

BRIEF DESCRIPTION OF THE DRAWINGS

The present invention will be more fully described by reference to the accompanying drawings in which.

DETAILED DESCRIPTION OF THE PREFERRED EMBODIMENTS

Figure 1:
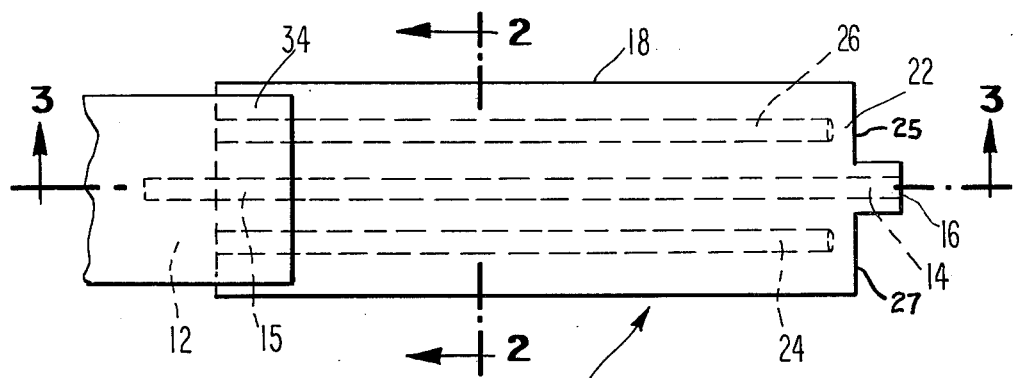
FIG. 1 is a top view of a stylus assembly incorporating the features of the present invention.

Referring now to FIG. 1, the stylus assembly incorporating the teachings of the present invention is shown generally at 10. The stylus assembly comprises an input electrode 12 which has been electrically connected to an electrical conductor in the form of a shaft 14. In the preferred embodiment, the shaft 14 is comprised of a tungsten ribbon having a cross-sectional area on the order of about $5 \times 10^{-4}$ square centimeters (0.005 inches by 0.015 inches). A first end 15 of the shaft 14 is electrically connected to the input electrode 12 as will be more fully described below. A second end of the shaft 14 terminates in a substantially planar surface 16 which is integral with the shaft 14 and which serves as an output electrode for the stylus assembly.

Figure 3:
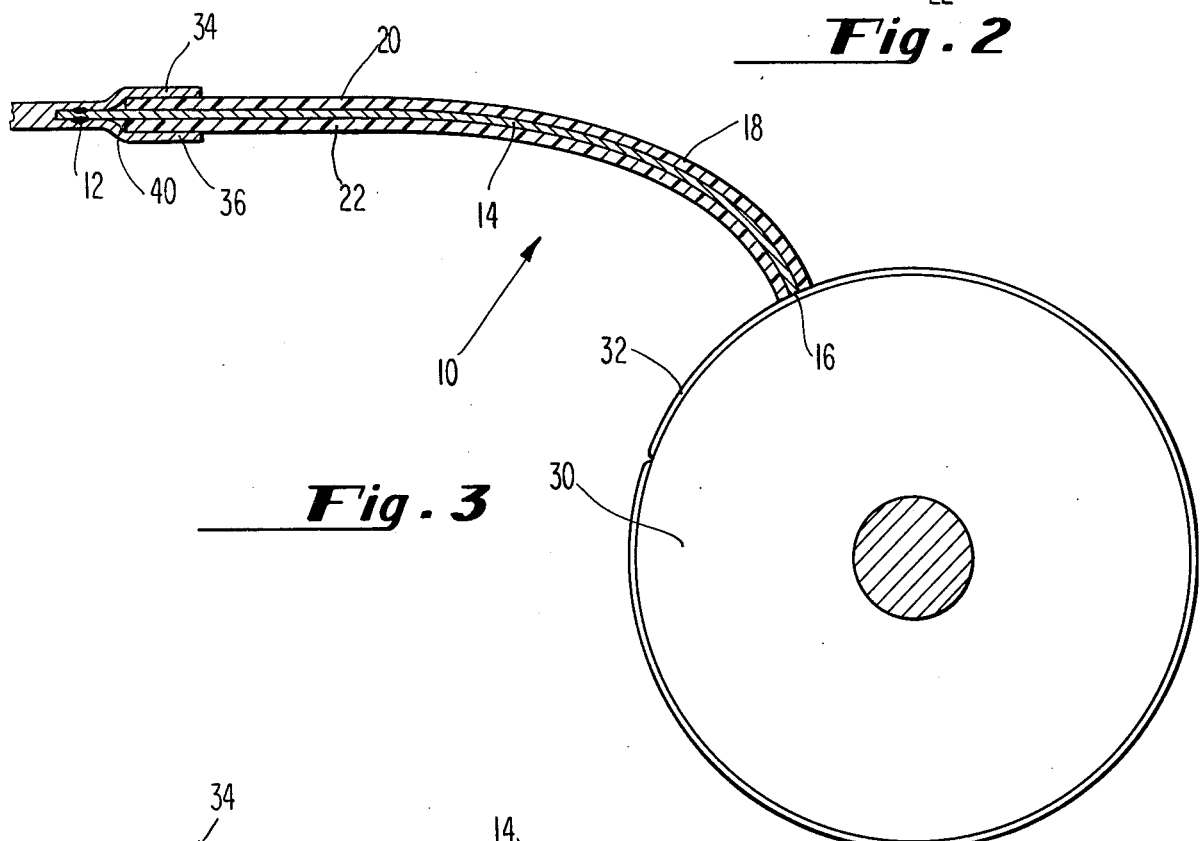
FIG. 3 is a cross-sectional view taken along line 3—3 of the stylus assembly shown in FIG. 1.

The input electrode 12 is connected to suitable facsimile receiver circuitry (not shown) while the output electrode is positioned adjacent the surface of a sheet of electrosensitive facsimile paper as described above. As shown in FIG. 3, the electrosensitive paper 32 is wrapped upon the surface of a rotating drum 30 in overlapping relationship at a clamp 33 which does create an irregularity in the surface of the paper 32.

In accordance with the present invention, an electrically insulating sheath 18 is provided. The insulating sheath 18 surrounds and completely enshrouds the electrically conductive shaft 14 except for the transversely extending surface 16 which comprises the output electrode. Accordingly, one end of the sheath 18 is flush with surface 16 completely enshrouding the conductive shaft 14, the danger of electric shock to the operator of the facsimile receiver is greatly reduced and the incidence of stylus breakage and wear has also been reduced. It has been found that stylus vibrations due to irregularities in the surface on which the stylus rides are damped very effectively by the enshrouded stylus using the spring wires 24 and 26. It has also been found that by the provision of an enshrouded stylus, airborne particulate emissions will be reduced to approximately ½ to ¼ of the emissions present when an unenshrouded conductive shaft 14 is used.

Figure 2:
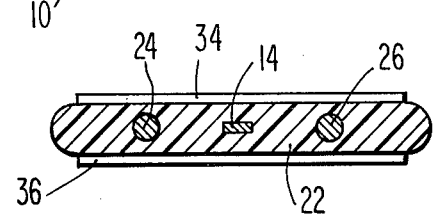
FIG. 2 is a cross-sectional view taken at line 2—2 of the stylus assembly shown in FIG. 1.

Emissions tests were performed utilizing the stylus of the type shown in FIGS. 1–3 wherein the insulating sheath 18 was trimmed away to expose ever increasing length of the conductive stylus shaft 14. In these tests, the atmosphere was collected to a rate of 2 liters per minute within two inches of the stylus for a period of one hour for each stylus configuration shown in the table below.

| The length of the conductive shaft 14 exposed (inches) | Total weight of solid emissions collected (mg.) |
| --- | --- |
| .000 | .73 milligrams |
| .005 | 3.15 milligrams |
| .010 | 3.08 |
| .020 | 3.13 |

From the foregoing, it is clear that once a certain length of the conductive shaft 14 is exposed, emissions from the stylus remains substantially constant. However, as long as the conductive shaft 14 is sheathed such that the insulation is substantially flush with the tip or surface 16 of the stylus, emissions are greatly reduced. As utilized herein, the term substantially flush means that the plane of the surrounding insulation is offset from the plane of the stylus tip less than one mil. or less than 5% of the maximum cross-sectional dimension of the stylus tip. Where the stylus tip has a dimension of 0.005 inches $\times$ 0.0015 inches, the maximum offset of the insulation versus the stylus tip plane would not exceed 0.00075 inches.

The particular material selected for the electrically insulating sheath 18 should be one with a high dielectric constant. It has also been found that use of a sheath material with a damping coefficient which will minimize vibration caused by irregularities at the surface of the paper 32. In this regard, various materials are satisfactory, for example, polyurethane, polytetrafluoroethylene, silicone or polyimide. However, whichever material is chosen, it will be understood that the present stylus assembly will dampen unwanted vibrations better than an unenshrouded stylus. It has also been found that the sheath 18 substantially reduces wear on the stylus.

In the preferred embodiment of the present invention, the electrically insulating sheath 18 is comprised of an insulating cable having opposed flat surfaces 20 and 22 as shown in FIGS. 2 and 3. The use of a flat conductive cable allows for the encapsulation or enshrouding of spring wires 24 and 26 which are situated adjacent to and parallel to the electrically conductive shaft 14. The spring wires 24 and 26 are not electrically connected to the input electrode 12 and are insulated from the document to be recorded upon by a separation provided by notches 25 and 27 at the sides of the shaft 14. The spring wires 24 and 26 may preferably be formed of an ordinary music wire having a diameter on the order of about 0.018 inches. The wires 24 and 26 are characterized by a high modulus of elasticity as compared, for example, to the tungsten of the shaft 14. It will be appreciated that the spring wires 24 and 26 as well as the conductive shaft 14 are preferably encapsulated within the insulating sheath 18 by a variety of techniques including extrusion and molding.

As may best be seen from FIG. 3, the spring wires 24 and 26 are curved such that the stylus assembly is positively biased toward the surface of the cylinder 30 upon which the electrosensitive paper 32 has been wrapped. The curve of the spring wires 24 and 26 in addition to the coefficient of damping provided by the insulating sheath 18 serves to keep the stylus assembly 10 from producing poor copies due to vibrations caused by irregularities at the recording surface of the paper 32 as caused by the drum 30 and a clamp upon which it is supported. Further, in the preferred embodiment, the input electrode 12 is comprised of an electrically conductive clip having first and second projecting arms 34 and 36. Between these arms the opposing surfaces 20 and 22 of the insulating sheath 18 are clamped. Electrical connection is made between the input electrode 12 and the conductive shaft 14 by various means such as a spot braze. It will, of course, be understood that other means may be utilized to electrically connect the shaft 14 to the electrode 12.

Figure 4:
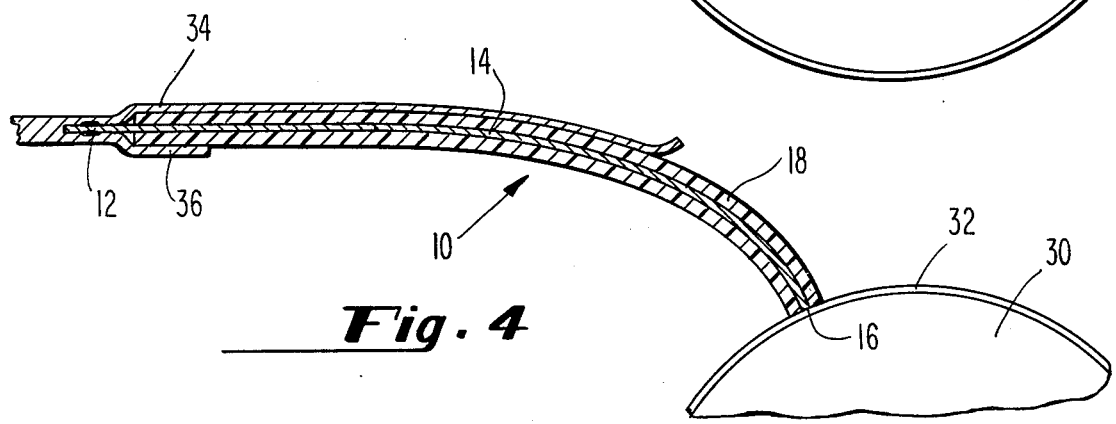
FIG. 4 is a cross-sectional view of a modified stylus assembly incorporating the features of the present invention.

Referring now to FIG. 4, a modification of the stylus assembly 10 disclosed in FIGS. 1 through 3 may be seen. The stylus assembly shown in FIG. 4 is similar to that shown in FIGS. 1 through 3 with the exception that the first projecting arm 34 of the input electrode 12 is extended and curved toward the drum 30 and the electrosensitive paper 32 which has been situated thereon. Accordingly, the arm 34, as well as spring wires 24 and 26, serves to bias the stylus assembly 10 toward the drum 30.

Figure 5:
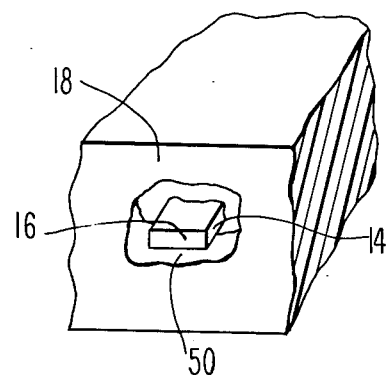
FIG. 5 is a perspective view of the end of the stylus of FIG. 1 after substantial use of the stylus.

In the foregoing discussion of the various embodiments of the invention, it has been assumed that the output electrode of the stylus conductive shaft 14 is substantially flush with the immediately adjacent insulation of the sheath 18. See for example FIG. 1 in the surface 16 which is shown as flush with the immediately adjacent insulation. In reality, the insulation while originally formed so as to be flush with the surface 16 does not remain in that condition after, for example, one hours use. Rather, a cavity or pocket 50 as shown in FIG. 5 is formed in the insulation 18 immediately adjacent the surface 16 of the stylus shaft 14. Although the plane of the insulation 18 located outwardly from the cavity 50 is substantially the same as the plane of the surface 16, the area of the sheath 18 in the bottom of the cavity is in a substantially different plane. However, this formation of the cavity 50 does not in any way adversely affect the excellent emission characteristics of the stylus.

Figure 6:
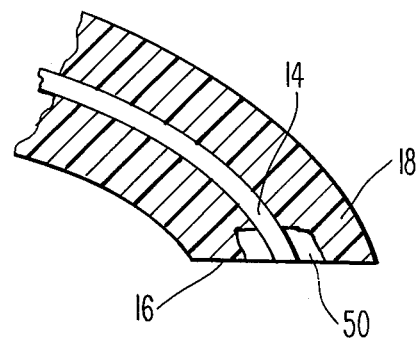
FIG. 6 is a partial sectional view of the used stylus shown in FIG. 5.

As is also shown in FIG. 6, the plane of the surface 16 is not necessarily at right angles to the axis of the shaft 14. In fact, it is generally desirable to form the surface 16 of the stylus at an angle with respect to the axis of the shaft 14. Under these circumstances, the substantially flush or coplanar surface of the sheath 18 is formed at substantially the same angle with respect to the axis of the shaft 14.

In the foregoing embodiments of the invention, the single conductive shaft 14 has been utilized within the sheath 18. However, the principles of this invention are equally applicable to a plurality of conductive shafts. In fact, the invention is particularly suited to a stylus using a plurality of conductive shafts since the sheath which surrounds the conductive shafts can assure that the appropriate and desired spacing between the conductors is maintained.

Figure 7:
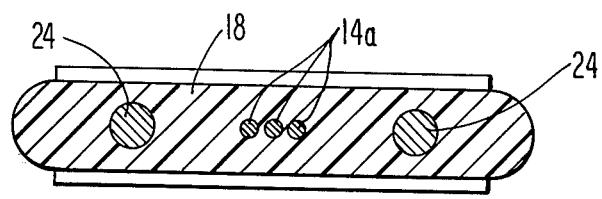
FIG. 7 is a cross-sectional view of another stylus assembly representing another embodiment of the invention.

In FIG. 7, a plurality of conductive shafts 14a are mounted within the sheath 18. As shown, the shafts 14a are relatively small, e.g., 0.005 inches in diameter and separated by equal spaces of 0.002 inches. Such conductors 14a may be simultaneously or selectively energized. Of course, it is important that the plane at the tip of the conductors 14a be substantially flush with the surrounding insulation allowing, of course, for the formation of a cavity such as that shown in FIGS. 5 and 6.

Figure 8:
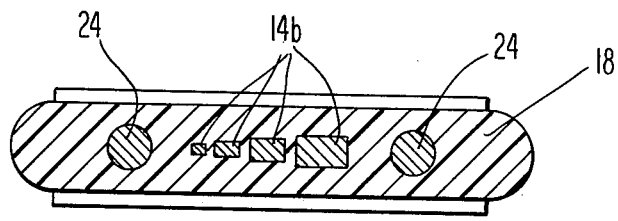
FIG. 8 is a cross-sectional view of another stylus assembly representing yet another embodiment of the invention.
Figure 9:
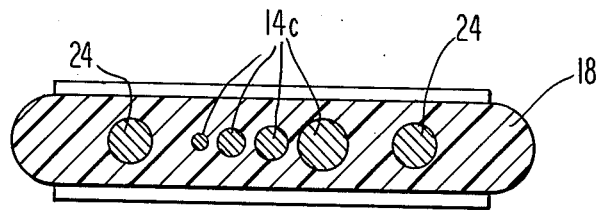
FIG. 9 is a cross-sectional view of still another stylus assembly representing still another embodiment of the invention.

FIGS. 8 and 9 show a plurality of conductors 14b and 14c which are of differing cross-sectional areas. Such conductors are adapted to be selectively energized depending upon the size of the mark desired. In the styli of FIGS. 8 and 9, the total exposed area of the conductors 14b and 14c increase from left to right.

Although a facsimile receiver circuit has not been shown and described herein, such a circuit is shown and described in copending application Ser. No. 606,506, filed Aug. 21, 1975 which is incorporated herein by reference.

While a particular embodiment of the invention has been shown and described, it will, of course, be understood that various modifications may be made without departing from the principles of the invention. For example, the stylus conductive shaft(s) may comprise molybdenum. The appended claims are, therefore, intended to cover any such modification within the true spirit and scope of the invention.

What is claimed is:

1. A stylus assembly for use in recording on a document, said stylus assembly comprising:
   an electrical conductor terminating at one extremity so as to form an output electrode surface adapted to mark a recording medium in response to an electrical potential between the conductor and the recording medium;
   an electrically insulating sheath extending to a plane substantially flush with said electrode surface; and
   elongated means comprising at least one spring wire and extending substantially parallel to said conductor coupled to said sheath said elongated means comprising a material having a higher modulus of elasticity than said conductor.

2. The stylus assembly of claim 1 wherein said conductor and said are curved to bias said stylus against said recording medium.

3. The stylus assembly of claim 2 wherein said assembly further comprises an input electrode electrically connected to the other extremity of said conductor.

4. The stylus assembly of claim 3 wherein said sheath comprises an insulating cable having opposing flat surfaces, said conductor being encapsulated between said surfaces.

5. The stylus assembly of claim 4 wherein said input electrode comprises an electrically conductive clip having first and second projecting arm, each of said arms grasping one of said opposed surfaces of said sheath.

6. A stylus assembly for use in recording on a document, said stylus assembly comprising:
   an electrical conductor terminating at one extremity so as to form an output electrode surface adapted to mark a recording medium in response to an electrical potential between the conductor and the recording medium;
   an electrically insulating sheath surrounding said conductor; and
   elongated spring means extending through said sheath in a direction generally parallel with said spring means such that said sheath substantially surrounds said conductor, said elongated means comprising a material having a higher modulus of elasticity than said conductor.

7. The stylus assembly of claim 6 wherein said conductor and said elongated spring means are curved.

8. The stylus assembly of claim 7 wherein said elongated spring means comprises a pair of elongated members generally parallel with and on opposite sides of said conductor.

9. The stylus assembly of claim 8 wherein said sheath comprises an insulating cable having opposing flat surfaces, said members and said conductor being substantially aligned between said surfaces.

10. A stylus assembly for use in recording on a document, said stylus assembly comprising:
- an electrically insulating sheath having a longitudinal dimension adapted to extend toward a recording medium having an exterior surface at the periphery of said sheath;
- an electrical conductor extending longitudinally through said sheath and terminating one extremity so as to form an output electrode surface adapted to mark a recording medium in response to an electrical potential between the conductor and the recording medium; and
- elongated spring means extending longitudinally through said sheath so as to be positioned between said conductor and a portion of the exterior surface of said sheath said elongated spring means having a material having a higher modulus of eleasticity than said conductor.

11. The stylus assembly of claim 10 wherein said conductor is curved to bias said stylus against said recording medium.

12. The stylus assembly of claim 10 wherein said sheath comprises an insulating cable having opposing flat surfaces, said conductor and said elongated spring means being encapsulated between said surfaces.

13. The stylus assembly of claim 12 wherein said elongated spring means comprises a pair of elongated spring members on opposite sides of said conductor.

* * * * *

UNITED STATES PATENT OFFICE
CERTIFICATE OF CORRECTION

Patent No. 4,189,736　　　　　　　Dated　February 19, 1980

Inventor(s)　Fred A. DeFilipps

It is certified that error appears in the above-identified patent and that said Letters Patent are hereby corrected as shown below:

Claim 2, line 2, before "are" insert --at least one spring wire--.

Signed and Sealed this

Twenty-ninth Day of July 1980

[SEAL]

Attest:

SIDNEY A. DIAMOND

Attesting Officer　　Commissioner of Patents and Trademarks